United States Patent [19]
Lehmann

[11] Patent Number: 6,082,184
[45] Date of Patent: Jul. 4, 2000

[54] METHOD FOR LEAK TESTING AND LEAK TESTING APPARATUS

[75] Inventor: Martin Lehmann, Obere Farnbuhlstrasse 1, CH-5610 Wohlen, Switzerland

[73] Assignee: Martin Lehmann, Wohlen, Switzerland

[21] Appl. No.: 09/073,852

[22] Filed: May 7, 1998

Related U.S. Application Data

[63] Continuation-in-part of application No. 08/862,993, May 27, 1997, Pat. No. 5,907,093.

[30] Foreign Application Priority Data

Mar. 10, 1998 [WO] WIPO ................ PCT/IB98/00309

[51] Int. Cl.⁷ .............. G01M 3/32; G01M 3/20; G08B 21/00
[52] U.S. Cl. .................. 73/49.3; 73/52
[58] Field of Search ............ 73/49.3, 49.2 R, 73/49.2 T, 52, 45.4, 40

[56] References Cited

U.S. PATENT DOCUMENTS

| | | | |
|---|---|---|---|
| 857,388 | 6/1907 | Eno ............................ | 73/49.2 R |
| 2,784,373 | 3/1957 | Lawrance et al. ............ | 73/49.3 |
| 3,381,523 | 5/1968 | Nettles ........................ | 73/49.2 R |
| 3,973,249 | 8/1976 | Yokote et al. ............... | 73/49.3 |
| 4,320,653 | 3/1982 | Bernhardt . | |
| 4,409,817 | 10/1983 | Edwards, Jr. . | |
| 5,199,296 | 4/1993 | Lehmann ..................... | 73/49.3 |
| 5,239,859 | 8/1993 | Lehmann ..................... | 73/49.3 X |
| 5,482,683 | 1/1996 | Shet et al. . | |
| 5,513,516 | 5/1996 | Stauffer ....................... | 73/49.3 X |
| 5,575,265 | 11/1996 | Kurihara et al. . | |

FOREIGN PATENT DOCUMENTS 9405991 3/1994 WIPO .

OTHER PUBLICATIONS

Patent Abstracts of Japan, vol. 011, No. 252 (P–605), Aug. 15, 1997, and JP62 056831A (Shinkosumosu Denki KK, Mar. 12 1987 *abstract*.

Patents Abstracts of Japan vol. 012, No. 081 (M–676), Mar. 15, 1998 and JP62 220774A (Agency of Ind. Science and Technol), Sep. 28, 1987 *abstract*.

Patent Abstracts of Japan vol. 095, No. 006, Jul. 31, 1995, and JP 07 072281A (Toshiba Corp.), Mar. 17, 1995, *abstract*.

*Primary Examiner*—Hezron Williams
*Assistant Examiner*—J. David Wiggins
*Attorney, Agent, or Firm*—Antonelli, Terry, Stout & Kraus, LLP

[57] ABSTRACT

For leak testing closed containers (9) which are filled with a filling product containing at least one liquid component the container is introduced in a test cavity (1) which is evacuated at least down to vapor pressure of that liquid component. The pressure in the surrounding of the container (9) and thus within test cavity (1) is monitored. Monitoring is performed by a vacuum pressure sensor (7), whereas lowering pressure surrounding the container (9) is performed by a vacuum pump (5). Leakage is detected by monitoring a pressure change in the surrounding of the container which is due to evaporation of liquid emerging from a leak and being evaporated in the low pressure surrounding, where such monitored pressure in the surroundings of same container is used in a comparison step that compares a signal derived from such pressure with a dynamic threshold value for identifying container leak conditions, enables another signal also derived from such pressure to be averaged with similar further signals of other containers previously tested as unleaky and also derives the dynamic threshold value from the result of such averaging.

65 Claims, 10 Drawing Sheets

EVAC TEST VENT

6,082,184

METHOD FOR LEAK TESTING AND LEAK TESTING APPARATUS

RELATED APPLICATION

This application is a continuation in part of application Ser. No. 08/862,993 filed May 27, 1997, now U.S. Pat. No. 5,907,093, issued May 25, 1999.

FIELD OF INVENTION

The present invention is generically directed on a technique for leak testing closed and filled containers, whereby the filling material comprises at least one liquid component.

BACKGROUND

Leak testing techniques according to which closed containers are introduced in a test cavity which, after having sealingly been closed, is lowered in pressure by a suctioning pump are known. If the container is not leaking, then once a predetermined pressure has been reached in the test cavity and thus in the surrounding of a container to be tested, this pressure will be kept substantially constant. If a leak is provided in an area of the container, wherein air is entrapped, a flow of air out of the container will lead to a rise of the surrounding pressure. If a leak is present in the area of the container where filling good is entrapped, the question whether such leak will lead to a significant rise of the surrounding pressure is largely dependent on the kind of filling good as of its viscosity, whether solid particles are present in the filling good and, obviously, on the largeness of the leak.

Different approaches have become known to accurately detect leaks at such product-filled containers, irrespective whether the leak is present in an air entrapping container area or in a container area covered with filling good. One such approach which is the topic of the co-pending European patent application EP-A-0 791 814 and the U.S. patent application Ser. No. 08/862,993 proposes to provide an impedance measurement, specifically a resistance measurement, just adjacent to the outer wall of the container by means of an electrode arrangement: As soon as liquid emerges from a leak it will contact a respective pair of impedance measuring electrodes and lead to a significant change of impedance measured between such electrodes.

Nevertheless, such an approach necessitates considerable additional expenditure with respect to provision of the impedance measuring arrangement in each test cavity, especially of a multi-cavity in-line inspection machine and does not enable detection of very small leaks far below of one micron and largely independent from container shape and kind of filling good.

OBJECT OF THE INVENTION

It is a primary object of the present invention to provide a leakage test method and apparatus, which may be applied to a very large scale of different containers and of different filling goods, provided at least one component thereof being liquid.

It is a further object of the present invention to provide such method and apparatus which are rather inexpensive with respect to electronic and further equipment, and which thus allow for very economic testing.

It is still further an object of the present invention to provide such method and apparatus which have a short measuring cycle and nevertheless a very high measuring accuracy.

SUMMARY OF THE INVENTION

These objects are realised by the testing method for leak testing at least one closed and filled container, whereby the content of the container comprises at least one liquid component and wherein a pressure difference is applied across at least a part of the wall of the container which part is to be leak tested and wherein the applied pressure difference is directed towards the surrounding of the container and wherein further the pressure in the surrounding of the container is monitored as a leak indicative signal which is characterised by the fact that the pressure difference is established by lowering the pressure in the surrounding of the container at least to a value which accords to the vapour pressure of the at least one liquid component of the filling product of the container to be tested.

The present invention departs from the recognition that if a container is leaking and liquid is drawn by the lower surrounding pressure to its outside this will—at a constant volume of the surrounding—lead to evaporation of the liquid as soon as the surrounding pressure reaches its vapour pressure. This leads to a significant change in surrounding pressure compared with the surrounding pressure which would establish at the same measuring conditions but with an unleaking container.

Monitoring the pressure in a test cavity containing the container, once vapour pressure of the possibly leaking liquid is reached reveals as being a very accurate technique for leak testing. It has been noted that by such a technique leak detection of containers with a very large spectrum of filling products may accurately be performed and that leaks at present moment down to 0.02 $\mu$m are accurately detectable.

Further, it has been noted that the volume of the test cavity is uncritical, so that by the inventive technique it becomes possible to simultaneously test batches of containers, thereby accurately detecting if one container of such a container batch is leaking.

As soon as the pressure surrounding a leaking container is lowered with respect to its interior pressure, some of the liquid is suctioned out of the container and as soon as the surrounding pressure reaches vapour pressure it starts to evaporate. As at a constant volume of the surrounding area of the container evaporation of the liquid leads to increase of pressure and the pump lowering the surrounding pressure must now remove vapour of the liquid too, significant measurements may be done especially after the surrounding pressure of the container becomes lower than the said vapour pressure. Nevertheless, it is preferred to provide pumping abilities which may evacuate the surrounding of the container to be tested to a significantly lower value than said vapour pressure, namely by at least two, preferably even by at least three decades.

As a leak-significant pressure change may be detected as soon as one of possibly several liquid components of the filling good starts to evaporate—in the case the content of the container contains more than one liquid component—it is recommended to select the vapour pressure of that component of the several liquid components which is the higher and to lower the pressure of the surrounding of the container at least to that vapour pressure value.

Although and as well known vapour pressure is a function of temperature and thus it might be advantageous in some cases e.g. to heat the surrounding of the container to a predetermined temperature so as to settle the relevant vapour pressure for a predetermined liquid, the inventive method and apparatus becomes significantly less complex if the test is performed at room temperature, and thus the vapour pressure to be at least reached is considered at room temperature, i.e. around 20° C.

Further, a very accurate leak detection becomes possible if the surrounding pressure of the container is measured at two subsequent points in time, whereby we understand under "point" that interval of time necessary for accurately measuring the prevailing pressure. Although it is absolutely possible to realise leak detection by applying the pumping action of the evacuating pump to the surrounding of the container and then by measuring the resulting surrounding absolute pressure after a predetermined time span, the said measuring of the surrounding pressure at two specific points in time allows to use the first value measured as a reference value and then to form the difference of the second value measured with respect to the reference value. There is thereby realised a pressure difference measurement instead of an absolute pressure measurement. More specifically, the first pressure signal which is measured at the first point in time is stored as an electric signal, then, after having measured the second pressure value, a difference is formed between the first value (still stored) and the second value.

The PCT patent application No. WO94/05991 with its US counterpart No. U.S. Pat. No. 5,239,859, assigned to the same applicant as the present invention, describes a method and apparatus for very accurately offset-compensated pressure difference measurement. In a preferred mode of operating the method according to the present invention as well as of realising the inventive apparatus, that pressure difference measuring technique and apparatus are used. Therefore, the WO94/05991 or the respective U.S. Pat. No. 5,239,859 are fully incorporated by reference in this present disclosure, although, and as will be seen most important features are specifically described also in this present application.

Because it is largely uncritical how big the surrounding volume of a test cavity for the container is, with respect to the volume of the container to be tested, the inventive method and apparatus reveals to have a further significant advantage:

If the wall of the at least one container to be tested withstands the pressure difference between container internal pressure (normally ambient pressure) and lowered surrounding pressure, such a container may simply be introduced in the test cavity forming the surrounding, largely irrespective how big such container is with respect to the test cavity. Nevertheless, a highly accurate indication of leakage will inventively be gained. Therefore, one and the same test cavity may be used for a large number of differently sized and different-volume containers. This results in a further advantage in that batches of more than one, even of a multitude of containers, may be introduced in one test cavity forming the surrounding and although one single container occupying only a small percentage of the overall cavity volume, an accurate leak indication will be detected if even only one of the batch-containers is leaking into the surrounding atmosphere.

A further significant advantage of the present invention is the following:

Sometimes the filled containers are not completely filled, but there is some amount of air entrapped in the closed container. If a leak is present in that area of such a container, which is adjacent to entrapped air or gas, by lowering the surrounding pressure, such air will be suctioned through the leak out of the container. With the pressure of the entrapped air in the container becoming progressively lower, there will also start vaporisation of the liquid component within the container and such vapour will also leave through the leak. Both, namely first the air leaving through the leak, then vapour leaving through the leak, will enlarge the surrounding pressure so that a leak in an entrapped air region of the container will lead to a change in the surrounding pressure, i.e. to rising of said pressure, as if the leak was in the liquid content covered area of the container wall. Thus, by properly setting a threshold value for leak detection according to the smallest still tolerated pressure change in the surrounding, it becomes uncritical whether such leak is present at an air-covered container area or at a content-covered container area.

If one and the same leak at an air-entrapped area of the container leads to a smaller pressure change in the surrounding, than the same leak would generate if situated at a liquid-covered container area, it is such a pressure change which will govern setting of a threshold value to detect whether a container is leaky or not. If, inversely, one and the same leak in a liquid-covered area would result in a smaller pressure change in the surrounding than such leak in an air-contacted wall area, then it is again that smaller pressure change which governs the threshold setting for detecting leaking/not leaking containers.

If a container under test is largely leaky, lowering of the surrounding pressure should be stopped as soon as such leaking is detected so as to prevent the content of the container to spoil the interior of the test cavity or, generally spoken, the surrounding of the container and possibly even the pumping arrangement more than absolutely necessary. This is realised either by monitoring whether the pumping action results in a predetermined lowering of surrounding pressure or not or one may detect spreading of content of the container into its surrounding by means of an impedance, thereby preferably a DC resistance measurement in the surrounding of the container just adjacent to the wall of the container which is to be tested. This is realised by providing an electrode arrangement in said adjacent surrounding and all around at least that part of the container to be tested. As soon as filling content of the container is suctioned to its outer wall, the electrode arrangement will be bridged by such content, leading abruptly to an indicative impedance change which, after having been detected, is used to stop further pressure lowering at the surrounding of the container.

This latter technique of rapidly detecting large leaks is applied especially to containers where it is necessary to snugly encapsulate them in the test cavity because their walls would not stand the pressure difference applied. In such a case the electrode arrangement for impedance measurement may be incorporated along the inner wall of the test cavity, which snugly fits with the at least one container. If such container is to be tested and therefore the test cavity snugly fits its shape, nevertheless a continuous volume is maintained between the outer wall of the container and the wall of the test cavity for defining the surrounding of the container by providing a sustaining grid or mesh inlay or preferably by roughening the interior wall of the test cavity so that a multitude of micro embossments of the test cavity wall sustain the container wall and prevent it from further outward bowing due to the applied pressure difference. Thereby, the intercommunicating space between such embossments defines for the surrounding space of the container.

Once the container in a test cavity, defining for its surrounding, has been detected as being leaky, it is probable that such test cavity will be contaminated by some of the container's content. Then, such cavity is cleaned after the leaky container has been removed, be it by evacuation and/or flushing with a flushing gas, preferably nitrogen, be it by heating or by combining these techniques, e.g. by a heated flushing gas.

If the inventive method or apparatus is applied for in-line testing containers and thus two or more of the inventive methods and of the respective apparatus are operated in parallel on a set of containers and one of such containers is detected to be leaky, then the respective test cavity defining for its surrounding is not anymore filled with a container at the next measuring cycle, but is kept empty, using that cycle during which the other cavities are in testing condition for cleaning and reconditioning the probably contaminated cavity. Further, it is proposed in some cases to accelerate squeezing-out of liquid, if a leak is present, by mechanically biasing the wall of the container inwardly, thus rising its interior pressure over atmospheric pressure.

To fulfil the object, the present invention proposes a leak testing apparatus for leak testing at least one closed and filled container, whereby the content of the container comprises at least one liquid component, which comprises at least one sealingly closable test cavity and at least one evacuation pump operationally connected to the test cavity and further at least one pressure sensor operationally connected to the test cavity, whereby the evacuation pump is selected so as to be able to pump the test cavity to at least vapour pressure of the liquid component of the container content, approx. at room temperature and the pressure sensor is a vacuum pressure sensor, preferably comprising at least a Pirani sensor stage.

Preferred embodiments of the inventive method and inventive apparatus are disclosed hereinafter. The inventive method and apparatus may preferably be used for leak testing blisters, vials, medical application containers, foodstuff or beverage containers, and tasks. Thereby, it must be pointed out that besides of leak testing of smaller containers, the present invention makes it possible to permanently monitor tightness of the tanks of huge tank plants, as for gasoline, gases etc., e.g. on train or street transports, thereby generating an alarm signal as soon as a leak is detected.

SHORT DESCRIPTION OF THE FIGURES

The present invention will now additionally be described with the help of figures showing specific and today preferred examples of realising the present invention. Such figures show:

FIG. 1 qualitatively the dependency of vapour pressure from temperature of a liquid;

FIG. 2 schematically an inventive test apparatus operating according to the inventive method;

FIG. 3 qualitatively the time course of the pressure of the surrounding of a container to be inventively tested for explaining the inventive method and apparatus operation;

FIG. 4 in a functional block diagram a preferred form of realisation of an inventively operated inventive test apparatus;

FIG. 5 as a functional block diagram a preferred form of realisation of the evaluating electronic at an inventive apparatus performing the inventive method;

FIG. 6 schematically batch operation of an inventive apparatus;

FIG. 7 schematically a test cavity for testing flexible wall containers;

FIG. 8 in a perspective view one half of a test cavity for inventively testing three containers as a batch;

FIG. 9 schematically a double-wall tank directly used to perform the inventive method with an inventive apparatus so as to survey tank leakage;

FIG. 10 schematically a preferred sealing at a test cavity of the inventive apparatus;

FIGS. 11a to 11c show the pressure courses on testing cycles, whereat the containers or medical application blisters are either largely or even very largely leaking (FIG. 11a), or have only a small leak (FIG. 11b), or are to be considered unleaky (FIG. 11c). The tests are performed with test cavities according to FIG. 8 without impedance measurement and thus without electrodes 32, 34.

FIG. 12 a signal flow/functional block diagram of the simplified preferred embodiment of an evaluation unit for operating the inventive method at an inventive apparatus;

FIG. 13 in a pressure versus time diagram the statistical variation of pressure courses measured at unleaky containers or at test cavities void of any containers, FIG. 14 in a simplified functional block/signal flow diagram a part of the inventive apparatus operating according to preferred mode of the inventive method, thereby forming a dynamic reference value for leak testing by means of a subsequently updated averaging;

FIG. 15 in a simplified signal versus time diagram qualitatively the preferred inventive method and accordingly operation of a preferred inventive apparatus, whereby dynamically updated reference values are formed for leak identification;

FIG. 16 a simplified signal flow/functional block diagram showing a further preferred mode of operation of the inventive method and respectively of the inventive apparatus, wherein a dynamically updated average signal is formed as the basis for a reference value to be compared with a pressure difference signal evaluated during container testing;

FIG. 17 in arbitrary unit over the time axis pressure measurements at subsequently operated test cavities of an inventive apparatus with multiple cavities to show dynamic update of an average signal, whereon reference values for comparison are based, leading to leakage identification;

FIG. 18 in a simplified schematic representation, a test cavity according to the present invention, which is pivoted during testing;

FIG. 19 the effect of pivoting the test cavity according to FIG. 18 on the relative location of a leak with respect to filling product;

FIG. 20 in a simplified functional diagram provision of a calibration standard leak to calibrate the inventive apparatus as performing the inventive method.

DETAILED DESCRIPTION OF DESCLOSED EMBODIMENTS

Figure 1:
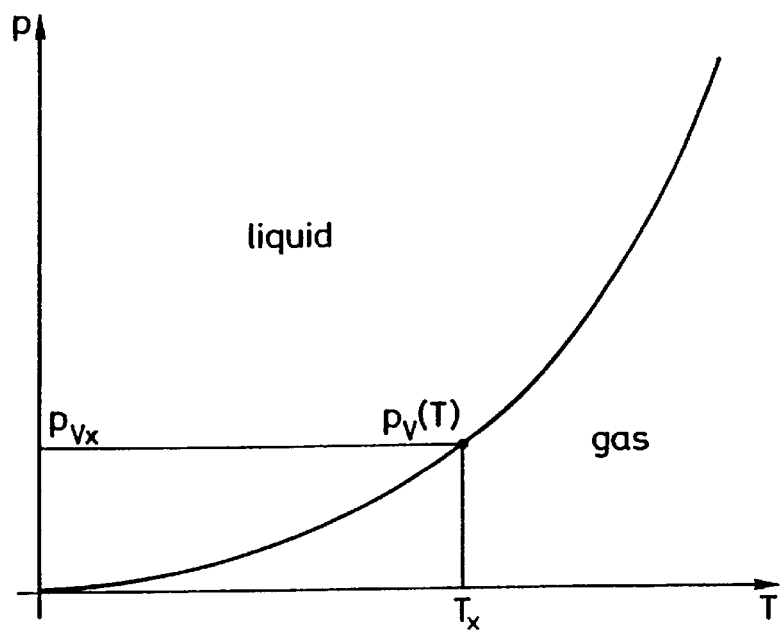

In FIG. 1 there is qualitatively shown the course of vapour pressure $p_V(T)$ in the pressure versus temperature diagram. At a predetermined temperature $T_x$ a liquid starts to evaporate when the respective vapour pressure $P_{Vx}$ is reached. Above the vapour pressure course the material is liquid, below the material is gaseous.

Figure 2:
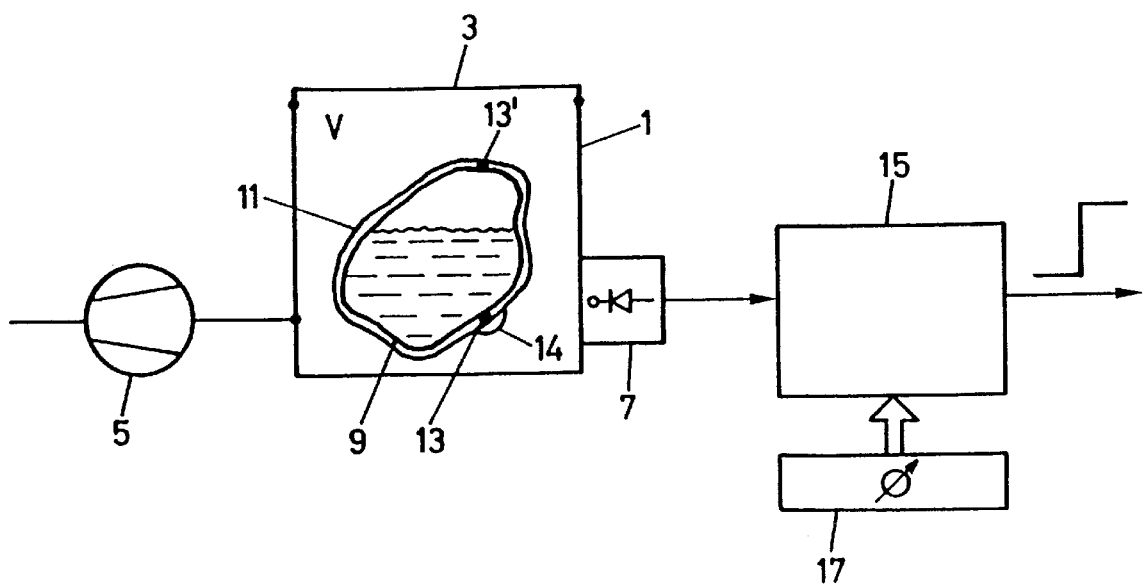

According to FIG. 2 an inventive apparatus comprises a test cavity 1 with a sealingly closable cover 3. A vacuum pump 5 connected to the test cavity 1 which may be a drag pump or a rotational piston valve pump or a diffusion pump or a turbo vacuum pump as a turbo molecular pump. This depends on the degree of vacuum which shall be established within cavity 1. Further, there is provided a vacuum pressure sensor 7 as e.g. a Pirani sensor, which measures the pressure prevailing in the test cavity 1. At least one closed container 9, which is filled at least to some extent with a filling product containing at least one liquid component is introduced through opened cover 3 into the test cavity 1 which is then sealingly closed. By starting operation of vacuum pump 5 the surrounding of container 9 and thus the intermediate volume V of test cavity and container 9 is lowered.

Figure 3:
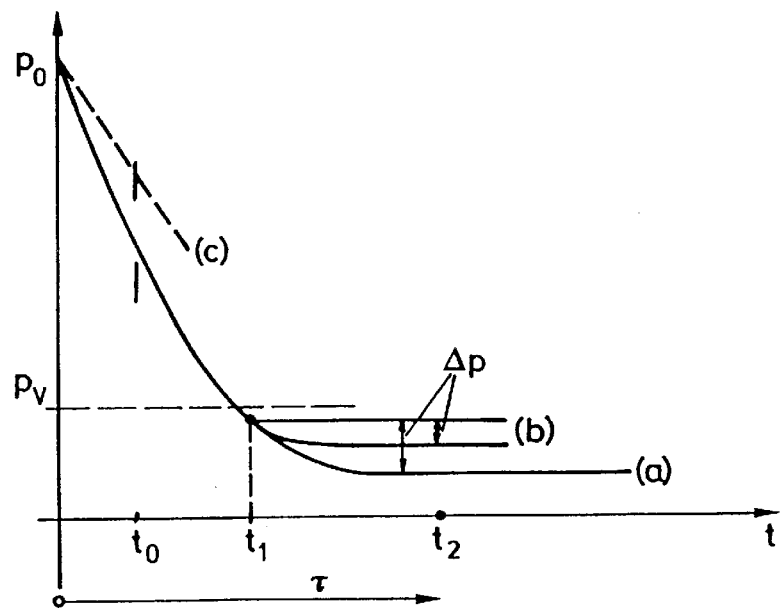

According to FIG. 3 starting at ambient pressure $p_o$ the pressure in volume V is lowered at least down to the value $P_V$ which accords to the vapour pressure of the liquid component within the filling good of the container 9. It is advisable to select a vacuum pump 5 which enables to evacuate the test cavity 1 down to a pressure which is at least one, preferably two and even more preferred three decades lower than the vapour pressure $P_V$ of the liquid content of the filling product.

The test is preferably performed at room temperature, i.e. at a temperature T of about 20° C. If the liquid content is water then the vapour pressure $P_V$ of water at room temperature is about 20 mbar and it then is preferred to provide an evacuation pump 5 which is able to evacuate the test cavity to about $10^{-2}$ mbar.

If the container provided in the test cavity 1 having a relatively rigid wall 11 is not leaky, then qualitatively the pressure in volume V will follow the course (a) according to FIG. 3 down to the more or less constant value of pressure, which may be reached by that type of vacuum pump installed. If, on the other hand, the container 9 is leaky as schematically shown in FIG. 2 e.g. at location 13, then a small amount 14 of liquid component of the filling good will be drawn through the leak 13 out of the container 9 and as soon as the pressure prevailing in the volume V becomes $P_V$ starts to evaporate into the volume V. As qualitatively shown in FIG. 3 this leads to a pressure versus time course according to (b), i.e. evaporation of the liquid leads to a pressure rise in volume V, counteracting the action of the vacuum pump 5. The vacuum pump 5 will have to remove additionally the vapour to finally achieve a vacuum level according to course (a). If the leak is situated at an area of the container 9 where air is entrapped, as in FIG. 2 at 13', then evacuation of volume V will first lead to suctioning air out of the container, again counteracting the operation of vacuum pump 5, then the liquid content within container 9 will start to evaporate within the container and vapour will be suctioned out of leak 13'. This, too, will lead to a pressure rise in volume V, counteracting the pressure course which would be followed if just air had to be removed by vacuum pump 5.

By means of the vacuum sensor 7 the course of pressure in the volume V is monitored. Experiments have shown that largely independent of the amount of volume V in a test cavity a significant difference of pressure according to the courses (a) and (b) of FIG. 3 is reached after a time span τ of a few seconds (one to three seconds) and at a leak smaller than 1 micron (0,02 μm), the pressure difference between a leaky and an unleaky container being of about one pressure decade. Measurements were performed with water as liquid content.

Although it is absolutely possible to measure the absolute pressure in volume V, e.g. after the time span τ to detect leakage of the container a pressure difference measurement is preferred, as will first be explained with the help of FIG. 4. Back to FIG. 2 the pressure sensor 7 is operationally connected to an evaluating unit 15, whereat especially leak indicative threshold values are preset, as schematically shown by means of a presetting unit 17. The output of the evaluation unit 15 is a two-state signal indicating leaky or not leaky.

Figure 4:
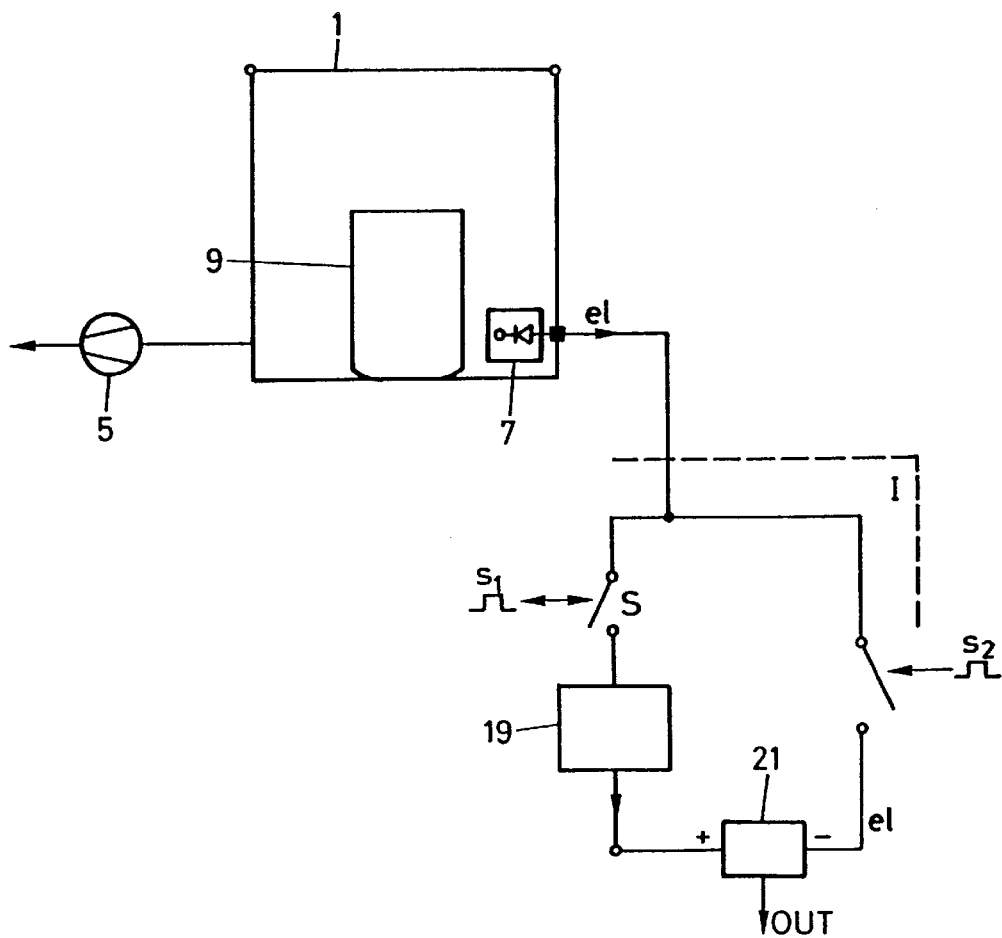

According to FIG. 4 the output of the vacuum sensor 7 is input to a storage unit 19, controlled by a timing control signal $s_1$, as schematically shown via switch S. According to FIG. 3 this is performed at a first point in time $t_1$. At a second point in time, according to FIG. 3 $t_2$, the output of the storage unit 19 and the output of the sensor 7 are connected to respective inputs of a difference forming unit 21, which generates an output signal which accords with the pressure difference $\Delta p$ of FIG. 3.

Figure 5:
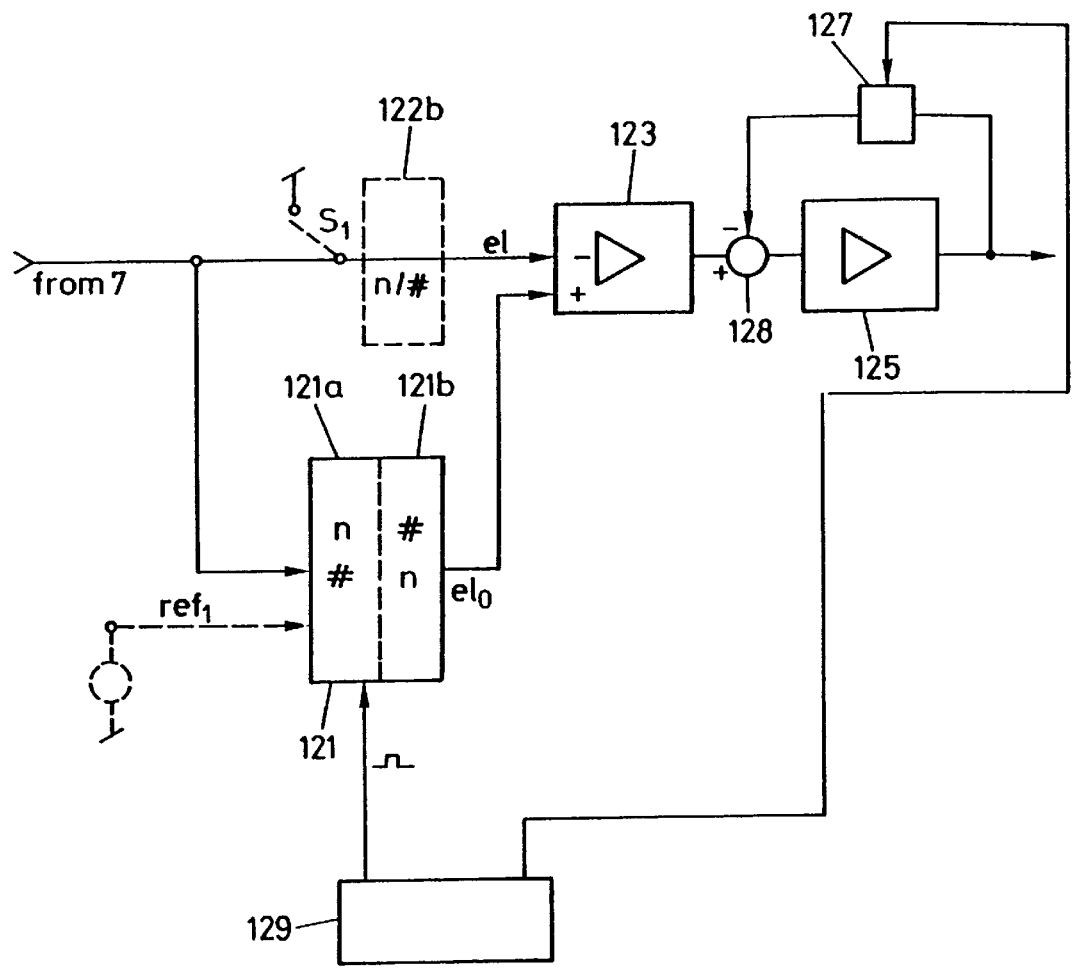

A further, most preferred realisation of the evaluation electronic is shown in FIG. 5. The output signal of sensor 7 is input to a conversion unit 121, which comprises, as an input stage, an analogue to digital converter 121a, followed by a digital to analogue converter 121b. The output of the converter stage 121 is fed to a difference amplifier unit 123, which additionally receives directly the output signal from sensor 7. The output of the difference amplifier unit 123, according to the difference unit 21 of FIG. 4, acts on a further amplifier unit 125, the output of which being superimposed at 128 to its input via storage unit 127. The input of the storage unit 127 is fed from the output of unit 125. A timer unit 129 time controls the arrangement. For storing a first pressure value from sensor 7, according to FIG. 3 at time t1, the timer unit 129 enables a conversion cycle at unit 121, so that a reconverted analogue output signal $el_o$ appears at the output. Simultaneously, the substantially same signal from sensor 7 is applied as signal el to the second input of unit 123. Thus, at the output of unit 125, a zero signal should appear. Nevertheless, in general a zero-offset signal will appear at the output of unit 125, which signal is stored in the storing unit 127, enabled by the timing unit 129. At time t2 no conversion is triggered at the unit 121, so that there appears at the input of amplifier 123 directly from sensor 7 the pressure value prevailing at $t_2$ and, from stage 121, the stored pressure value which was prevailing at $t_1$. Further, the zero offset signal which was stored in unit 127 is superimposed as a offset-compensating signal so that the resulting signal at the output of amplifier unit 125 is zero-offset compensated.

This allows a very accurate measurement of pressure difference Δp according to FIG. 3.

If the container under test has a large leak, then, and according to FIG. 3 course (c) the pressure prevailing in the volume V of the test cavity 1 will have just from the beginning of operating the vacuum pump 5 a different course. This may easily be detected, e.g. by comparing at a previous point in time to the output signal of sensor 7 with a predetermined threshold value (not shown), and if such threshold value is not reached by the actual pressure, the effect of the vacuum pump 5 on test cavity 1 is disabled. This to avoid that, with a larger leak, a huge amount of content of the container is suctioned into the test cavity and contaminates that cavity.

As was mentioned, the proposed method accurately functions largely independently from the volume V between test cavity 1 and the at least one container to be tested. This allows, according to FIG. 6, to simultaneously test batches 9' of containers 9, thereby maintaining accuracy of detecting whether one or more than one of the containers 9 leak. Further, the fact that detection accuracy is not critical with respect to difference volume V leads to the possibility of providing one test cavity 1 for a multitude of differently shaped and different-volume containers 9 to be tested therein.

Figure 7:
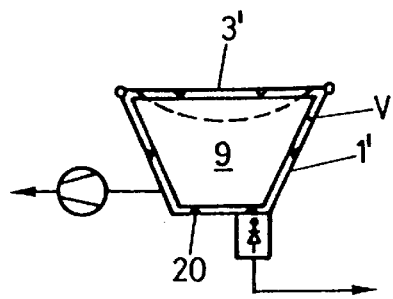

If the wall of a container to be tested may not mechanically withstand the pressure loading of approx. 1 bar, then, and as schematically shown in FIG. 7, a test cavity 1' with cover 3' is provided which snugly fits with the shape of the container 9. Thereby, protrusions 20, as schematically shown in FIG. 7, prevent that by effect of the evacuation the walls of the container are firmly suctioned on to the inner wall of the test cavity and thus make sure that there remains a volume V between container and test cavity wall for being evacuated according to the invention. Such protrusions 20 may be realised by a mesh or grid inlay or, and preferably, by mechanically roughening the inner wall of the cavity, so that micro-embossments sustain the wall of the container, thereby leaving a continuous interspace as volume V.

As shown in dashed line in FIG. 7 it might further be advantageous, e.g. when closing the cover 3 or 3' of the cavity, to mechanically bias a part of the container's wall inwardly, thereby increasing the inner pressure of the container 9 and additionally pressing liquid component of the filling product out of a leak if such a leak is existent.

Figure 9:
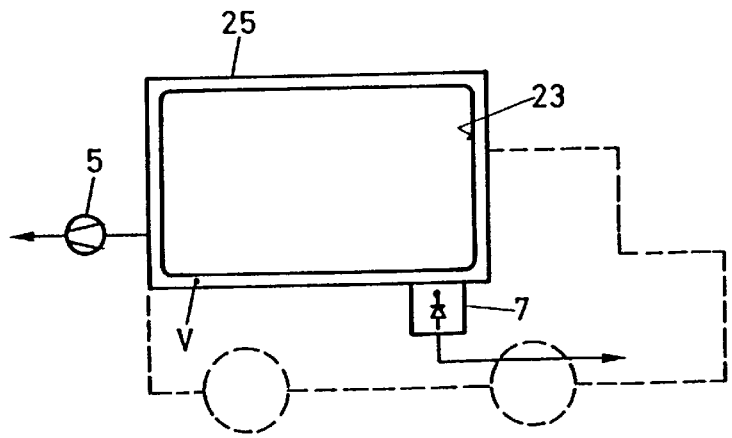

According to FIG. 9 the method and apparatus according to the present invention may be used to monitor huge tanks with respect to leakage. In FIG. 9 there is shown a tank with double-wall, namely with an inner wall 23 and an outer wall 25. Testing tightness of both these walls is performed by using the intermediate volume of the two walls, as volume V according to FIG. 2. Such a technique may be applied e.g. for tanks on road or rail vehicles or for huge stationary tank plants, e.g. for gasoline.

Figure 8:
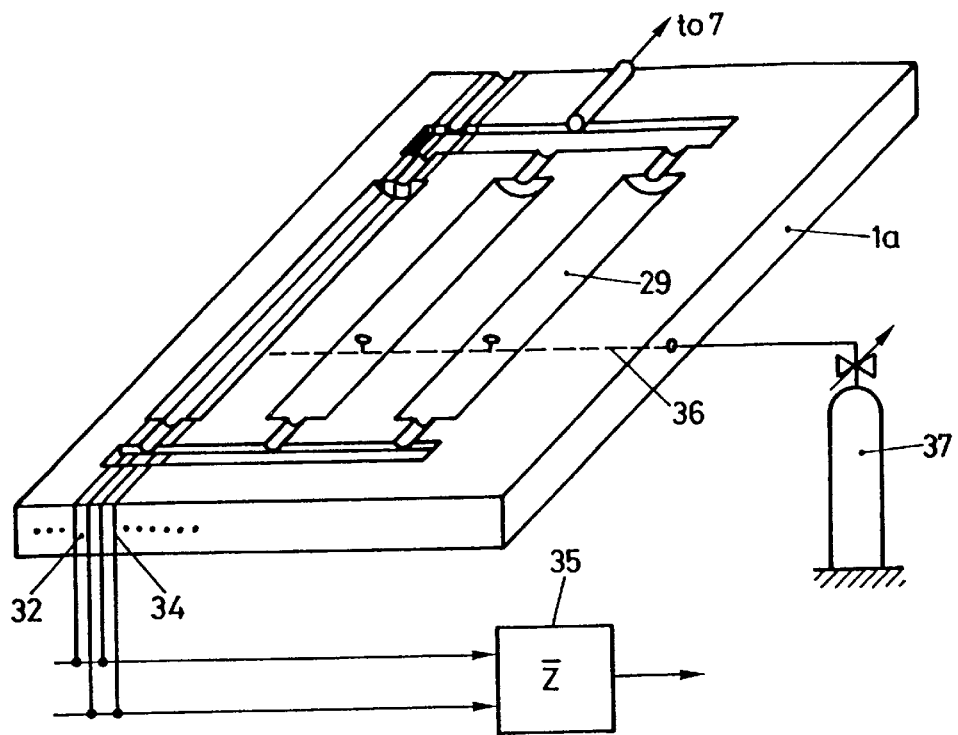

In FIG. 8 there is shown one half 1a of a test cavity 1 for applying the inventive method in an inventive apparatus on three containers at 29 as on small plastic containers for medical appliance. The containers may have flexible walls as the test cavity 1 snugly fits their shape. There is further shown another technique to rapidly detect whether one of the containers has a large leak. There are provided impedance measurement electrodes 32 and 34 integrated in the wall of the cavity 1 and mutually electrically isolated. They are connected to an impedance or, preferably, resistance measuring unit 35. If by applying a vacuum to the test cavity, preferably with a roughened interior wall, liquid filling content is suctioned to the outside of the container wall, this is quickly detected by an abrupt change of impedance measured between the electrodes 32 and 34. The output of the impedance measuring unit 35 disables (not shown) further evacuation of the test cavity 1.

Once a test cavity has been spoiled by outpouring filling good of a leaking container it is cleaned, either by cleaning evacuation and/or pouring with a gas, preferably with nitrogen, and/or by heating. In FIG. 8 there is shown a feeding line for a flushing or cleaning gas, controllably fed from a gas tank 37 to a contaminated test cavity 1, which gas preferably is nitrogen.

Two cavity halves, 1a according to FIG. 8 are sealingly put one upon the other to complete a test cavity 1 according to FIG. 2.

If in-line testing of containers shall be performed, for which the present invention is especially suited due to its short measuring cycle, more than one, namely a set of several test cavities is provided, e.g. on a carousel, which are automatically loaded with containers to be tested (not shown) from a conveyor and which perform simultaneously the described testing technique. If one of the containers tested in such cavity is detected to be leaky, then the respective cavity is not reloaded with a further container afterwards, but this cavity is maintained empty during the measuring cycle on a next set of containers. Meanwhile, the cavity kept unloaded is cleaned, as was described, either by evacuation and/or gas flushing and/or heating.

Figure 10:
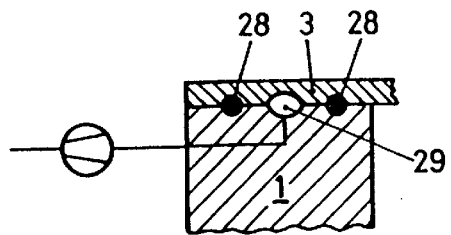

Obviously, there must be realised a good vacuum-tight sealing between a cover 3 or 3' of the test cavity and the main body of the test cavity 1 or between the two halves 1a of test cavity according to FIG. 8. This is realised preferably by providing at least a pair of parallel seals 28 as of concentric O seals and by separately pumping an intermediate space 29 between such seals, as shown in FIG. 10. If the container to be tested contains a filling product with more than one specific liquid component, the vapour pressure of that component is selected for leak detection which has the highest vapour pressure, i.e. which component starts to evaporate at relatively highest pressure. Thereby, viscosity has to be considered too, i.e. a component is to be selected for defining the vapour pressure, which component is liquid enough to penetrate smallest leaks. By evacuating the test cavity down to a pressure which is significantly lower than the vapour pressure of any liquid component it becomes uncritical which vapour pressure value is to be considered.

Figure 11A:
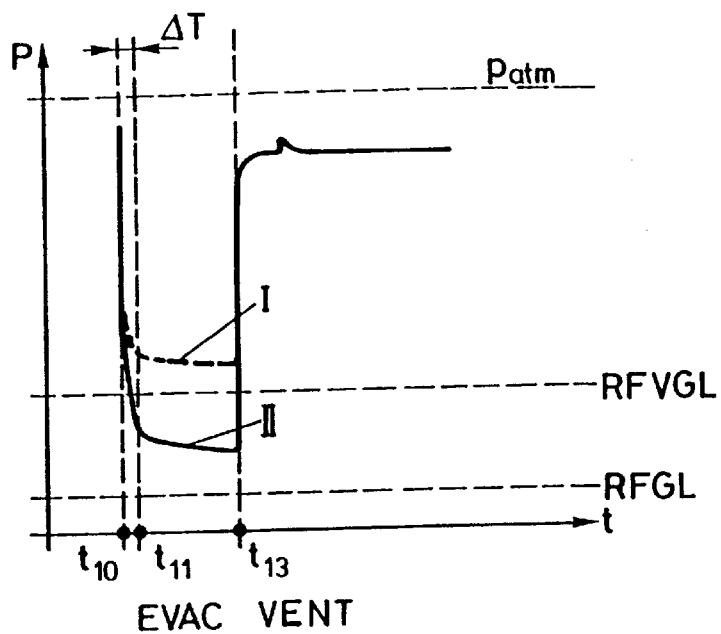
Figure 11B:
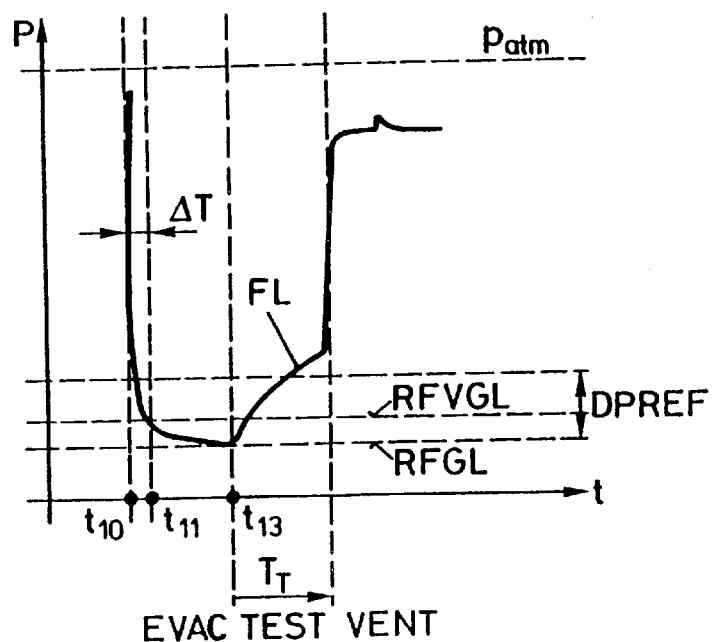
Figure 11C:
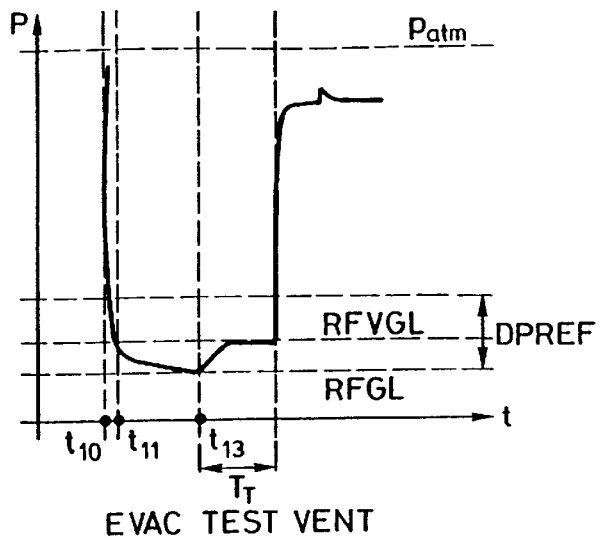

Pressure versus time courses as measured according to the inventive method and with an inventive apparatus, both in preferred mode, are shown for containers with large leaks in FIG. 11a, for small leaks in FIG. 11b and for unleaky containers in FIG. 11c.

These figures shall be discussed in connection with FIG. 12, which shows a preferred monitoring and control unit according to units 15, 17 of FIG. 2.

Figure 12:
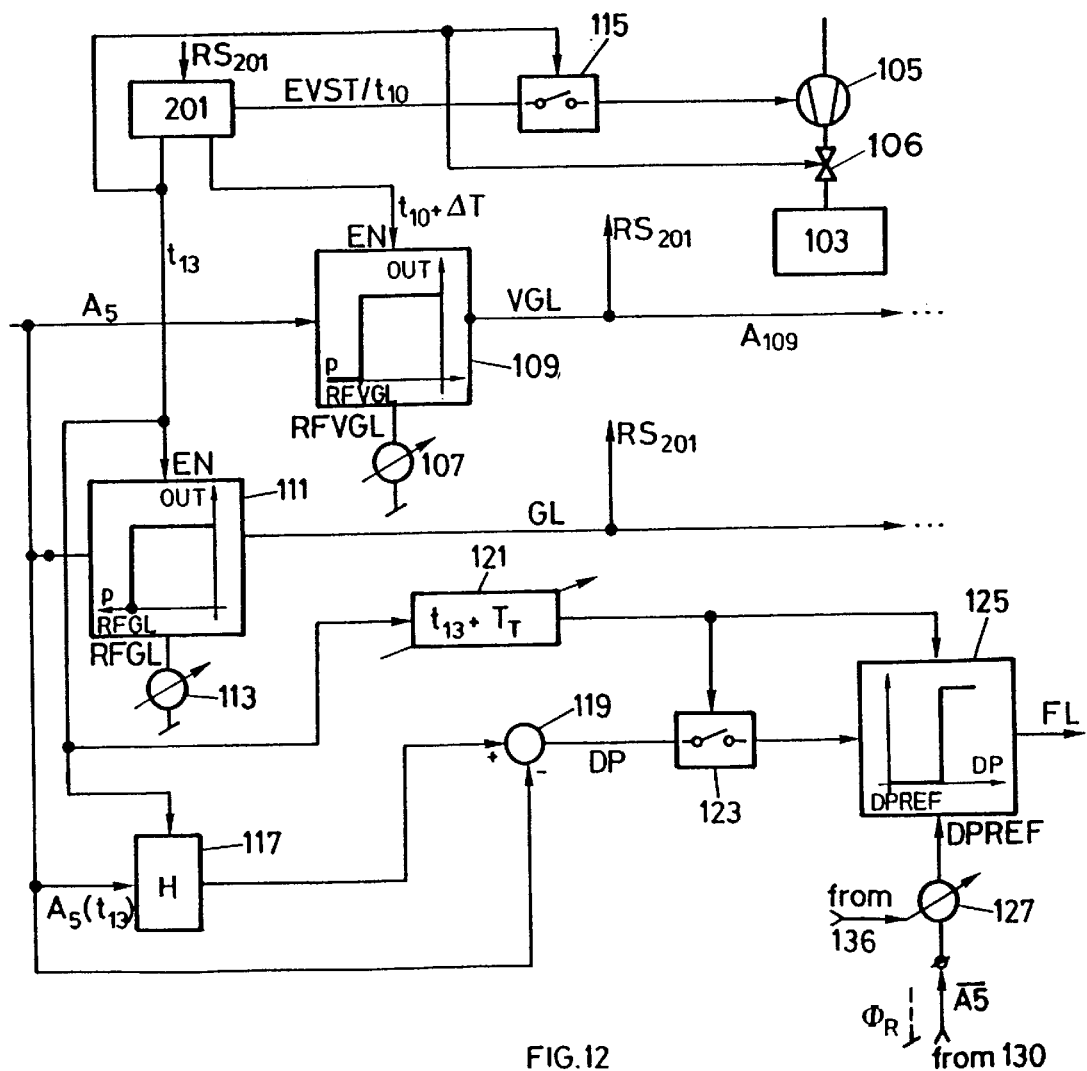

According to FIG. 11a the timing unit 201 of FIG. 12 initiates at time $t_{10}$ evacuation of a test cavity 103 by means of the pumping arrangement 105. This is shown in FIG. 12 by the evacuation start signal EVST/$t_{10}$.

After a fixed predetermined amount of time $\Delta T$ of e.g. 0.75 sec. the output signal of the pressure sensor within test cavity 103 (not shown in FIG. 12), $A_5$, becomes compared with a first reference signal preset at a presetting source 107, RFVGL. To this target, comparator unit 109 is enabled by timer unit 201 at $t_{10}+\Delta T$.

If after time span $\Delta T$ the actual monitored pressure according to electric signal $A_5$ of FIG. 12 has not reached the value of RFVGL according to course I of FIG. 11a, this means that a very large leak VGL is present. This is detected at comparator 109 generating the output signal $A_{109}$. If according to the characteristics shown in the block 109 of FIG. 12 the output signal of this comparator unit 109 enabled at $t_{11}=t_{10}+\Delta T$ is e.g. still at a high level indicating presence of a VGL, this is output at the VGL output. If the pressure prevailing in the surrounding of the container 103 under test, i.e. in the test cavity, has reached and crossed reference level RFVGL according to course II of FIG. 11a, the VGL output signal is not generated.

As will be explained later, occurrence of the VGL signal preferably stops the evacuation cycle because contamination of the vacuum pump 105 may have occurred or might occur due to the very large leak of the container under test.

As shown by the course II of FIG. 11a as VGL does not occur evacuation continues up to a further moment of time $t_{13}$. At the time $t_{13}$ the timer unit 201 disables pumping arrangement 105 and disconnects as by a valve 106 the pumping arrangement from chamber 103. Further, timer unit 201 enables comparator unit 111, to which a further reference value RFGL is led, generated by a reference signal source 113. If at $t_{13}$ the pressure prevailing in the surrounding of the test cavity has not reached RFGL then comparator unit 111 generates an output signal GL indicating that the container under test has a large leak. Here again, and as will be further explained later on, some reactions are taken with respect to further operation of the testing system.

If either the signals VGL or GL are initiated by the respective comparators 109, 111, the timer unit 201 is principally reset because the testing has been completed and the quality of the instantaneously tested container established has been identified. This is schematically shown in FIG. 12 by the signal $RS_{201}$. If not reset, shortly after $t_{13}$ the value $A_5$ $(t_{13})$ of the pressure prevailing in the surrounding of the container is stored in a holding or storing unit 117. The output of the holding or storing unit 117 is led to one input of a difference forming unit 119, whereas the second input of this unit 119 is connected to the output $A_5$ of the pressure sensor monitoring the pressure in the surrounding of the container under test. After a presettable test cycle time $T_T$ starting at $t_{13}$, as schematically shown by unit 121 of FIG. 12, the pressure difference DP at the output of unit 119 is evaluated, as represented in FIG. 12 by switching unit 123. This pressure difference DP is fed to a further comparator unit 125 enabled at the lapse of testing time $T_T$. By means of a further reference value source 127 the reference value DPREF is fed to the comparator unit 125. As will be explained later, the value of DPREF may controllably be varied in time and/or a reference value $\phi_R$ to which DPREF is referred to may also controllably be varied in time.

If DP at time $t_{13}+T_T$ is larger than the reference value DPREF, then a signal FL is generated at unit 125, indicating presence of a fine leak FL in the container under test. This according to the situation as shown in FIG. 11b. If DP does not reach DPREF, then the container is considered unleaky as none of the signals VGL, GL and FL have been generated. This according to FIG. 11c.

If the VGL signal is generated according to FIG. 12, the evacuation pump 105 is immediately disconnected from any testing chamber 103 it is connected to, be it a single chamber or be it in an in-line processing where one pump 105 is parallel connected to a multitude of testing chambers 103, from all such chambers. This because at a very large leak the vacuum pump 105 could have been contaminated by leaking content of the container. It thereby is absolutely possible to provide for such a case a redundant pumping arrangement which may be connected to the one or the more than one testing chambers to continue testing, whereas the possibly contaminated first pumping arrangement is reconditioned.

In a multiple chamber in-line testing system, as e.g. in a carousel testing plant with a multitude of testing chambers, occurrence of the signal GL indicating a large leak and possibly also the occurrence of the signal FL indicating for a fine leak leads preferably to disabling or "bypassing" that chamber with the leaky container from further being supplied with containers to be tested, whereas the other chambers are still operating and performing tests on newly supplied containers. This bypass of a testing chamber, whereat a container has been identified as heavily or even slightly leaking, is performed so as not to influence further testing results at that chamber which wouldn't thus be representative anymore due to content of the leaky container having possibly contaminated that chamber.

This bypassed chamber is reconditioned during further testing cycles at the other chambers.

Reconditioning may be done by heating that chamber, flushing it by a liquid and/or a gas, especially by a heater gas. Whether or not that chamber has been properly reconditioned is checked by having it tested as if it was filled with a container to be tested. Thereby, the condition of proper reconditioning is indicated if DP according to FIG. 12 at that empty chamber does e.g. not reach DPREF or an appropriately set "Empty Chamber DPREF"-value (ECDP-REF).

Such ECDP-REV may be provided by measuring $DP_e$ at the clean, empty test chambers and by storing these measuring values $DP_e$ as respective reference values for testing the chambers on proper reconditioning.

When looking to the FIGS. 11a to 11b, it may by recognised that setting the reference value RFGL and especially setting of the reference pressure difference value DPREF may be very critical and may largely influence accuracy of the system. Thereby, influences as surrounding temperature, moisture of ambient air, slight contamination of pump etc., may influence the prevailing pressure course and lead to false results if these critical reference levels and especially DPREF are set for utmost accuracy.

Figure 13:
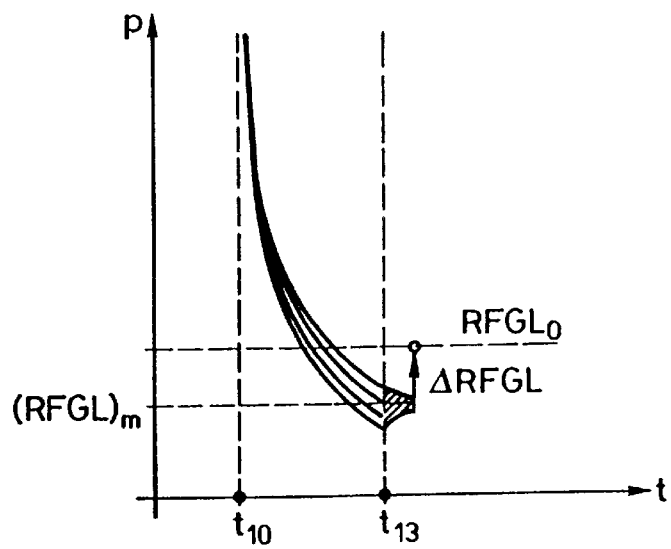
Figure 14:
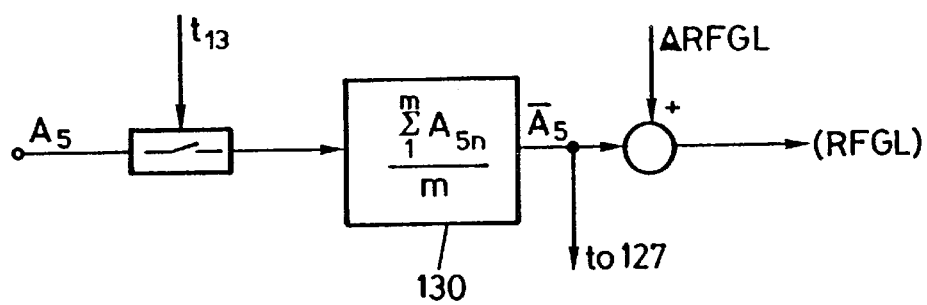

In FIG. 13 there is quantitatively shown the pressure course according to the courses of FIGS. 11a to 11c, but measured at test cavities void of containers. At $t_{13}$ there occur statistically distributed slightly different pressure values. Thus, before beginning testing of containers at a multiple test cavity plant, the unfilled, tightly closed test cavities are tested according to FIG. 13 to establish an average $(RFGL)_m$. The value of RFGL as used at the comparator 111 of FIG. 12 or as used according to the FIGS. 11a to 11c is found in that an offset value ΔRFGL is added to $(RFGL)_m$. It must be pointed out that ambient parameters as temperature, humidity of ambient air etc. may be considered constant during the calibrating cycle performed at the empty and conditioned test cavities and leading to the measuring results according to FIG. 13. Nevertheless, during ongoing time as during on-line testing, these disturbing parameters may slowly change and may vary $(RFGL)_m$.

Every time during multiple or in-line testing, be it subsequently with a single test cavity or consecutively with a multitude or at least more than one test cavity, at the respective time $t_{13}$, up to which the respective container has been identified as not heavily leaky, the actual output signal of the pressure sensor is entered into an averaging unit 113, wherein the last m values of actual pressure of not heavily leaky containers are averaged. The output average result signal accords with $(RFGL)_m$ of FIG. 13, but varies in time, e.g. due to varying ambient parameters. To the output average result $\overline{A5}$ and according to FIG. 13 the offset ΔRFGL is added, the result of that addition is a dynamically varying reference value RFGL, which is applied to comparator unit 111 of FIG. 12. This dynamically varying reference value RFGL is shown in FIG. 15, starting from an initial setting, as e.g. found as was explained with the help measurements at empty test cavities 103.

Figure 15:
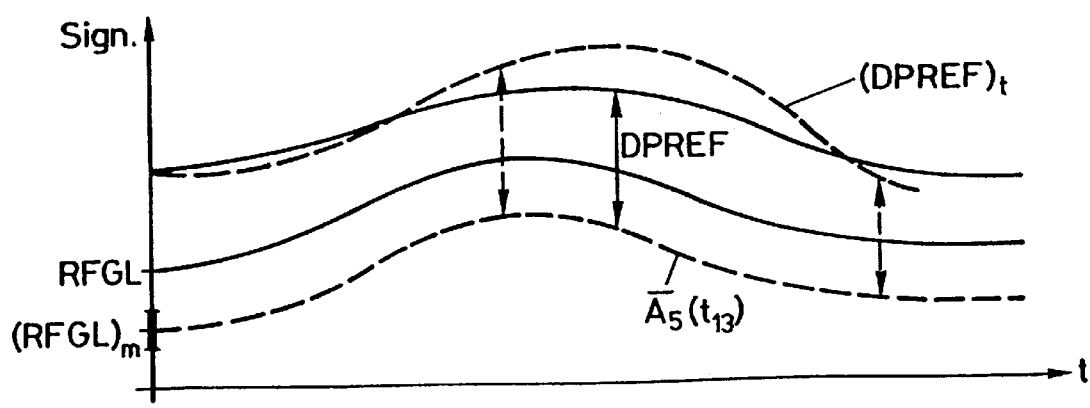

As may clearly be seen now from FIG. 15, the average pressure value $\overline{A5}$ $(t_{13})$ is now the basis for also referring DPREF to. Therefore, and as shown in FIG. 12, the difference pressure reference value DPREF is not referred to an absolute static value as $\phi_R$ but is referred to $\overline{A5}$.

Figure 16:
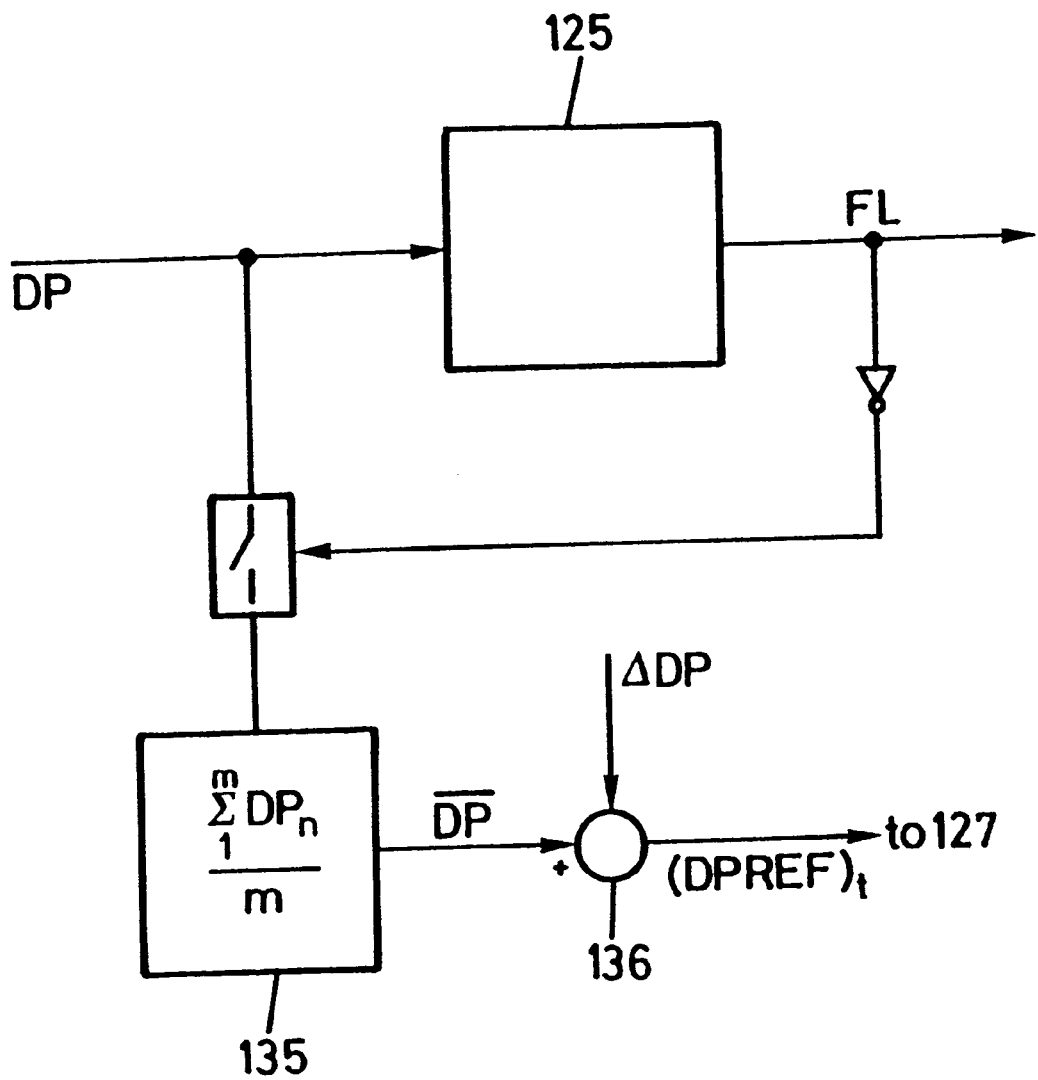

An even further improvement of accuracy is reached as will now be described, which may be realised separately or additionally to realising a dynamic RFGL and based thereon a dynamic upper limit of DPREF. Thereby and according to FIG. 16 at the end of the time span $T_T$ the actual pressure difference DP is led to an averaging unit 135 whenever the output signal FL indicates that the container under test is unleaky. The output signal of unit 135 which accords to an average pressure difference signal $\overline{DP}$ averaged over the last m test cycles, is offset by an amount ΔDP, the result thereof being used as DPREF signal applied at unit 127 of FIG. 12.

Looking back on FIG. 15, whereat, as discussed before, a constant DPREF signal was applied the technique of averaging DP results, as schematically shown with a course (DPREF)$_t$, in a dynamically varying check value DPREF, varying according to variations of disturbing parameters, influencing such pressure difference.

It is clear that provision of a dynamically varying (DPREF)$_t$ signal according to that representation in FIG. 15 could be realised without providing a dynamically varying base value $\overline{A5}$, in referring (DPREF)$_t$ to a stable, constant value $\phi_R$, as shown in FIG. 12 in dashed representation instead of referring to a dynamically varying $\overline{A5}$ value.

It is evident that preferably the evaluations of the output signal $A_5$ of the one or more than one test cavities is performed digitally, i.e. after analogue to digital conversion of the output signal of the respective sensor or sensors.

Figure 17:
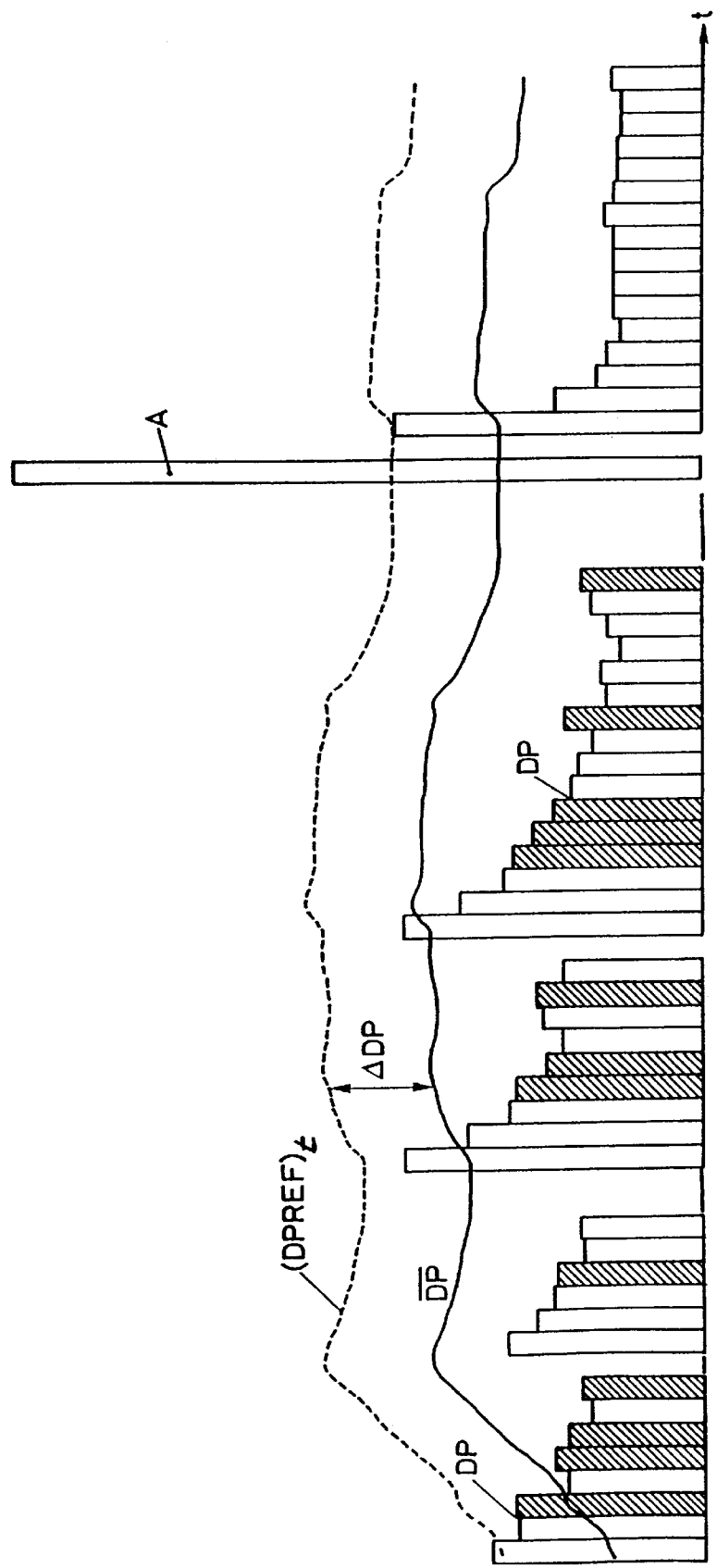

In FIG. 17 there is shown over the time axis and in arbitrary units the actual pressure difference values DP measured successively at a multitude of test cavities of an in-line testing plant. According to FIG. 16 the calculated average pressure difference $\overline{DP}$ is shown and the offset ADP finally leading to (DPREF)$_t$ according to FIG. 15 or 16. As may clearly be seen, the average $\overline{DP}$ and thus (DPREF)$_t$ vary in time and along successive testing, whereby pressure difference values as at A, which are higher than the instantaneously prevailing (DPREF)$_t$, are disregarded with respect to influencing the averaged $\overline{DP}$, as such measurements are due to leaky containers according to FIG. 11b.

Further, whenever the test of a container within a specific test cavity results in a leak-indication for a predetermined number of subsequent tests, as e.g. three times subsequently, such test cavity is also bypassed for further testing and is considered as contaminated or as leaky itself, thus being reconditioned. Such a test cavity is likely to have been contaminated during succeeding testings at leaky containers or is likely not to be tight, which will be recognised during reconditioning and testing on proper reconditioning too, as was described above.

Further, and as was already mentioned, for some containers to be tested and especially for some filling products it is advisable to heat the test cavities to a predetermined temperature which is preferably controlled at each test cavity, e.g. by a negative feedback temperature control. Thereby, the temperature-dependent evaporation pressure of the filling product is set within a predetermined pressure range. Such heating is thereby preferably accomplished in a pre-heating cycle before the actual testing cycle according the FIGS. 11a to 11c is performed.

As was mentioned above, a leak in a container will be identified irrespective of the fact whether such leak is in an area of container's wall exposed to entrapped air within the container or to the filling product. Nevertheless, for some filling goods as e.g. with particulate content in liquid, there might occur differences with respect to time a respective pressure difference develops in the surrounding of the container under test.

Figure 18:
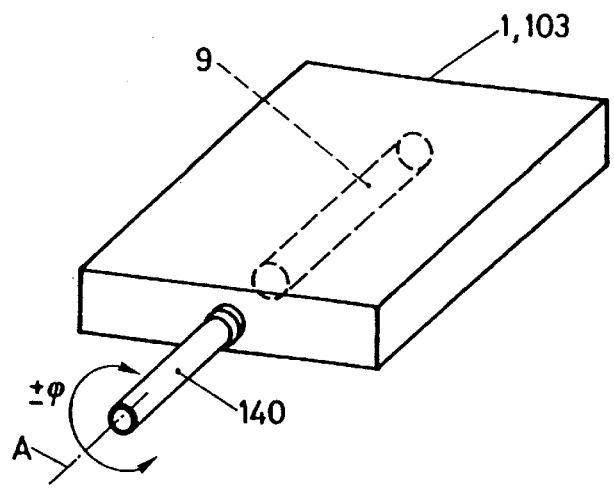
Figure 19:
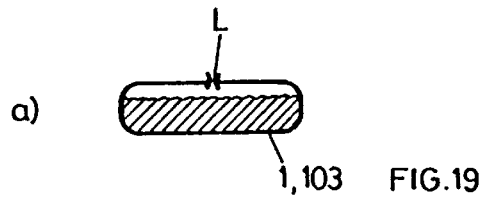
Figure 19:

Therefore, and as schematically shown in FIG. 18, it may be advisable in some cases to provide the one or the several test cavities 103 for the container to be tested 9 to be movable. This is e.g. accomplished by mounting the test cavities 103 pivotable with respect to a pivot axis A and driven via a rotational axis 140. Thereby, leads to and from the pressure sensor within such test cavity, to and from a heating arrangement at such a test cavity etc. may be led through the driving axis 140. The cavity 1, 103 is preferably not rotated, but is rotatably oscillated as shown by ±$\phi$ in FIG. 18. By this technique, and as schematically shown in FIG. 19, a leak L is moved into air and into liquid contact, so that testing will consider vaporising of liquid content whenever it occurs, be it in the position according to FIG. 19a or in the position according to FIG. 19b.

Proper functioning of the testing apparatus and calibration of the evaluation unit, be it a one-chamber tester or a at multiple-chamber testing plant as for in-line testing, is further preferably accomplished with the help of a standard leakage arrangement which is preferably mounted on the test plant, so that recalibration and/or overall testing of the plant may be accomplished whenever desired. The arrangement of such a standard or calibration leak arrangement is shown in FIG. 20.

Figure 20:
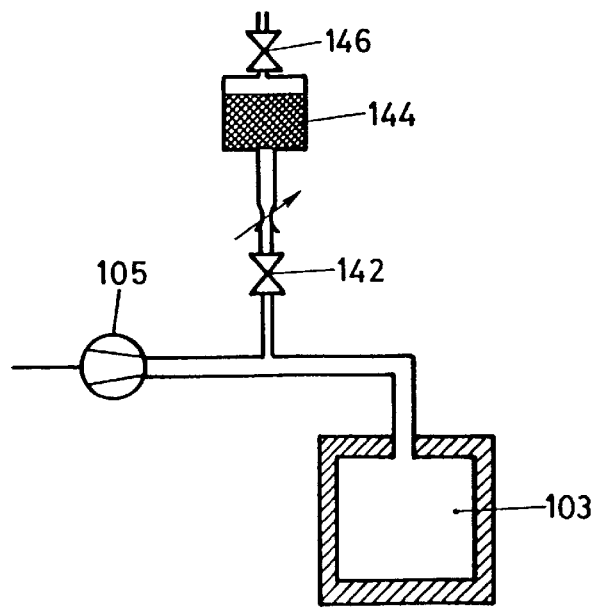

According to FIG. 20 there is provided in the line from a test cavity, as 103 according to FIG. 12, to the vacuum pump 105 a needle valve 142, which is adjustable but which preferably is preset not variable by the user of the plant on a predetermined leakage value. Via the needle valve 142, the line to the vacuum pump 105 is connected to a liquid reservoir 144, which preferably is filled with distilled water. Via a pressurising line and valve 146 the reservoir 144 may be adjustably pressurised. The needle valve is set to such a value that no distilled water of reservoir 144 will penetrate into the connection line of chamber 103 to vacuum pump 105, but only vapour. Nevertheless, by adjusting pressurisation of the water within reservoir 144 via line and valve 146 a leak of different and varying extent may be simulated without liquid penetrating and spoiling chamber and/or connection line and/or vacuum pump. For a plant with a multitude of testing cavities such a calibration arrangement with needle valve 142 may centrally be provided and connected in parallel to all chambers 103, as in such a plant preferably there is provided one central pumping arrangement 105 acting in parallel on all the chambers or cavities provided. Alternatively such a calibration arrangement may be provided separately for each of the chambers 103 provided.

Figure 6:
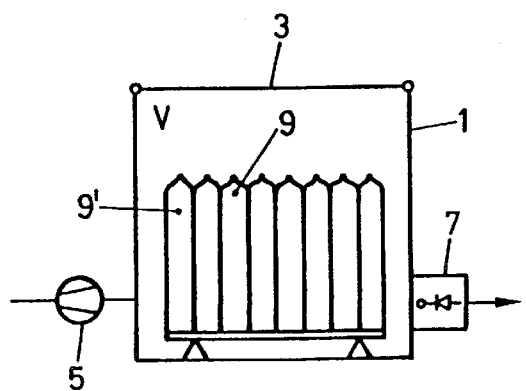

It has been recognised that by applying the described technique of leak testing by lowering the surrounding pressure of a container under test below vapour pressure of a liquid component of its content, it is mostly not necessary to additionally provide resistance measurements, as was explained with the help of FIG. 8, so that, at the respective test chambers, the electrode arrangements and measurement units may be omitted, which significantly reduces costs for the overall plant and its complexity. The invention is especially suited for testing vials or blisters, especially for medical appliances, in-line with their production by checking every singly vial or blister. If and as schematically shown in FIG. 6 a multitude of containers 9 are mechanically linked together to form a set of such of containers, clearly such a set is considered as one container with respect to leak testing.

With the inventive method and apparatus as for blisters the entire testing cycle, i.e. from $t_{10}$ to the end of $T_T$ according to the FIG. 11 is performed in less than 2 sec. This leads at an in-line plant with a multitude of test cavities, e.g. with 24, e.g. arranged on a carousel, to a very high throughput.

What is claimed is:

1. A method for leak testing at least one closed and filled container, whereby the content of said container comprises at least one liquid component and wherein a pressure difference is applied across at least a part of the wall of the container, which part is to be tested, said pressure difference being directed towards the surrounding of said container and wherein the pressure in said surrounding is monitored as a leak indicative signal, further comprising that siad pressure difference is established by lowering said pressure in said surrounding and further comprising the step of comparing a signal derived from said pressure monitored with a dynamic threshold value for identifying leak condition of said container and enabling a further signal derived from said pressure monitored to be averaged with similar further signals of other containers previously tested as unleaky if said identifying of the container now under test reveals an unleaky container and further deriving said threshold value from the result of said averaging.

2. The method of claim 1, characterized by the fact that said pressure in said surrounding is lowered towards a pressure value which is lower than said vapour pressure by at least two or three decades.

3. The method of claim 2, wherein more than one liquid component is present in the content of said container and said pressure in said surrounding is lowered to at least, said vapour pressure which is the higher vapour pressure of the vapour pressures of said liquid components.

4. The method of claim 1, wherein said test is performed at room temperature.

5. The method of claim 2, wherein said pressure monitored as said leak indicative signal is monitored after reaching said vapour pressure.

6. The method of claim 1, wherein said pressure monitored is sampled at a first point in time, resulting in a first pressure measuring signal and is sampled at a second, subsequent point in time, resulting in a second pressure measuring signal and that a pressure difference formed by said two pressure measuring signals is evaluated as leak indicative signal.

7. The method of claim 6, including the step of generating said first and second measuring signals as electrical signals, and storing said first signal at least up to said second point in time.

8. The method of claim 6, further comprising the step of providing a pressure measuring sensor in said surrounding and operationally connecting said sensor to both inputs of a difference forming unit at said first point in time, generating a zero offset signal dependent from the output signal of said difference forming unit, storing said zero offset signal and compensating zero-offset at said signal difference of said two measuring signals by said stored zero offset signal.

9. The method of claim 6, including by the step of providing a pressure measuring sensor in said surrounding and comparing the output signal of said sensor with one or more than one predetermined signal values.

10. The method of claims 6, further comprising the step of storing said first measuring signal by means of an analogue to digital converter, enable for conversion at said first point in time.

11. The method of claim 10, including the step of reconverting the digital output signal of said analogue to digital converter into an analogue signal.

12. The method of claim 1, further comprising the step of simultaneously testing a batch of said containers as one container.

13. The method of claim 1, further comprising the step of performing an impedance measurement at or at least adjacent to said part of said wall in said surrounding, particularly a resistance measurement with DC and enabling or disabling further lowering of said pressure in said surrounding by the result of said impedance measurement.

14. The method of claim 1, further comprising the step of providing a test cavity with a test chamber snugly fitting the outer shape of said at least one container, thereby maintaining at least at said part a residual volume to be lowered in pressure and between said part and the wall of said test cavity.

15. The method of claim 1, further comprising the step of providing a test cavity for said at least one container, said test cavity defining for a test chamber significantly larger than the volume of said container.

16. The method of claim 1, further comprising the step of providing a test cavity for said container and cleaning at least said test cavity after a container therein has been detected as leaking, said cleaning being performed by evacuating said cavity and/or by flushing with a gas, and/or by heating.

17. The method of claim 1, further comprising the step of inline testing a series of said containers in a set of test cavities and further comprising the step of disabling testing in a test cavity for at least one testing cycle if the container previously tested therein has turned out to be leaky.

18. The method of claim 1, further comprising the step of increasing internal pressure of said at least one container by mechanically biasing at least a part of its wall inwardly.

19. The method of claim 1, for at least one container, wherein said one component is water, and including the step of evacuating said surrounding to less than 20 mbar.

20. The method of claim 1, further comprising the steps of initiating lowering said pressure with a predetermined suctioning power;

identifying for a large leak if said pressure monitored does not reach a first predetermined pressure value in a predetermined time;

disabling further lowering of said pressure;

monitoring a change of said pressure monitored during a further predetermined time and identifying a small leak or no leak dependent on the extent of said change.

21. The method of claim 1, further comprising the step of lowering said pressure during a predetermined time and at a predetermined suctioning power.

22. The method of claim 1, further comprising the step of establishing a maximum threshold value for said pressure monitored to be reached after a predetermined time of lowering and disabling a pumping arrangement from lowering said pressure of said surrounding if said pressure monitored does not reach said maximum threshold value at said predetermined time.

23. The method of claim 22, said disabling comprising disconnecting said pumping arrangement from said surrounding.

24. The method of claim 23, further comprising the step of switching said surrounding to a further pumping arrangement for performing a subsequent leak testing cycle.

25. The method of claim 1, further comprising the steps of providing said surrounding within a test cavity for said at least one container and disabling said test cavity for at least one further testing cycle if a leaky container is detected in said test cavity.

26. The method of claim 25, further comprising the step of reconditioning said test cavity during said at least one testing cycle.

27. The method of claim 26, further comprising the step of performing said reconditioning by at least one of heating, gas purging and liquid purging.

28. The method of claim 26, further comprising the step of checking whether said test cavity is properly reconditioned by performing said leak testing at said test cavity empty from a container to be tested.

29. The method of claim 1, further comprising the steps of comparing a signal derived from said pressure monitored with at least one threshold value to identify leakage condition of said container and deriving said at least one threshold value from said pressure monitored at a test cavity defining for said surrounding and void of such container.

30. The method of claim 1, wherein said signal derived from said pressure monitored at said predetermined moment is a difference signal to a signal derived from said pressure monitored at a further predetermined moment.

31. The method of claim 1, further comprising the step of providing at least one test cavity for said container and calibrating said pressure monitored by performing said leak testing at said test cavity void of container and connected to a reference leak arrangement.

32. The method of claim 31, further comprising the step of providing said reference leak arrangement by a needle valve to a reservoir containing a liquid and being controllably pressurisable.

33. The method of claim 32, said reservoir containing distilled water.

34. The method of claim 32, further comprising the step of controlling said reference leak and pressure to prevent liquid to leak therefrom and to enable vapour of said liquid to transit therethrough.

35. The method of claim 1, further comprising the step of providing said surrounding in a test cavity and subsequently performing said leak testing with said test cavity on different of said containers, thereby disabling said test cavity from further testing if a leaky container was identified therein for a predetermined number of subsequent tests.

36. The method of claim 1, further comprising the step of heating said surrounding during said testing to a predetermined temperature.

37. The method of claim 1, further comprising the step of performing a testing operation for identifying larger leaks of said at least one container, previously to performing said method for leak testing.

38. The method of claim 1, further comprising the step of inline testing a series of said containers in a set of test cavities, thereby converting said pressure monitored in each of said test cavities in an electrical signal and generating at least one reference electrical signal by lowering said pressure in said test cavities void of containers.

39. The method of claim 1, comprising the steps of providing a set of test cavities each defining for one of said surroundings and monitoring said pressure in said surroundings at at least one predetermined moment after starting lowering said pressure in said respective surroundings,
comparing, respectively, a signal derived from said pressure monitored at said respective predetermined moment with a common threshold value for identifying leak condition of containers in said test cavities,
enabling a further signal derived from said pressure respectively monitored to be averaged with such further signals generated previously if said identifying reveals an unleaky container and deriving said common threshold value from the result of said averaging.

40. The method of claim 39, wherein said signal respectively derived from said pressure monitored at said predetermined moment is a difference signal with respect to a signal derived respectively from said pressure monitored at a further predetermined moment.

41. The method of claim 17, further comprising the step of reconditioning said test cavity disabled from testing and re-enabling said test cavity for testing after reconditioning.

42. The method of claim 41, further comprising the step of performing said reconditioning by at least one of heating, gas flushing, liquid flushing.

43. The method of claim 41, further comprising the step of checking whether said test cavity is properly reconditioned by performing said leak testing at said test cavity void of said at least one container.

44. The method according to claim 1 wherein said container is selected from the group consisting of blisters, vials, mechanical application containers, foodstuff or beverage containers, and tanks.

45. The method according to claim 1 wherein said method is for permanently testing tanks for leakage.

46. The method of claim 25, further comprising the step of reconditioning said test cavity disabled from testing and re-enabling said test cavity for testing after reconditioning.

47. The method of claim 35, further comprising the step of reconditioning said test cavity disabled from testing and re-enabling said test cavity for testing after reconditioning.

48. A leak testing apparatus for leak testing at least one closed and filled container, whereby the content of said container comprises at least one liquid component and comprising:
at least one sealingly closable test cavity
at least one evacuation pump operationally connected to said test cavity for reducing the pressure applied in said cavity about at least one container having a content comprising at least one liquid
at least one pressure sensor operationally connected to said test cavity
an evaluation unit with at least one pressure signal input operationally connected to said pressure sensor, said evaluation unit comprising:
at least one comparator unit, one input thereof being operationally connected to said at least one pressure signal input, a second input thereof being operationally connected to a controllable dynamic threshold value unit,
an averaging unit controllably operationally connected to said pressure signal input,
said evaluation unit generating a leak-identifying signal,
said leak-identifying signal controlling said operational connection between said pressure signal input and said averaging unit,
the output of said averaging unit controlling said controllable threshold value unit.

49. The apparatus of claim 48, wherein said evacuation pump is at least one of a drag vacuum pump, a piston valve vacuum pump, a diffusion pump or a turbo vacuum pump, said evacuation pump being selected so as to pump said test cavity down to at least vapour pressure of said component approx. at room temperature.

50. The apparatus according to claim 48, wherein said sensor comprises a Pirani sensor.

51. The apparatus of claim 49, further comprising a timing unit operationally connecting the output of said sensor to an output of said apparatus generating a leak indicative signal, once pressure within said test cavity has reached at least said vapour pressure value.

52. The apparatus according to claim 49, said evacuation pump being selected so as to be able to pump said test cavity down to a pressure at least smaller than said vapour pressure by one decade.

53. The apparatus of claim 49, further comprising a storage unit operationally connected to the output of said sensor and a difference forming unit, one input thereof being operationally connected to the output of said storage unit, the second input thereof being operationally connected to the output of said sensor, a timing unit operationally connecting the output of said sensor at a first point in time to the input of said storage unit and operationally connecting at a second point in time the output of said storage unit to said one input of said difference forming unit and the output of said sensor to said other input of said difference forming unit.

54. The apparatus of claim 53, wherein said timing unit enables said operational connection of said output of said sensor to said storage unit after said sensor has detected a pressure within said test cavity reaching said vapour pressure.

55. The apparatus of claim 53, wherein said storage unit comprises an analogue to digital converter, said timing unit being operationally connected to the conversion control input of said analogue to digital converter.

56. The apparatus of claim 53, wherein said timing unit operationally connects at said first point in time the output of said sensor to both inputs of said difference forming unit, and said apparatus further comprising a further storage unit operationally connected to the output of said difference forming unit and being enabled at said first point in time, the output of said further storage unit being operationally connected with the output of said difference forming unit at said second point in time.

57. The apparatus of claim 55, further comprising a digital to analogue converter operationally connected to the output of said analogue to digital converter, the output of said digital to analogue converter being operationally connected to said difference forming unit.

58. The apparatus of claim 48, wherein said test cavity has a shape snugly fitting said at least one container and comprising sustaining means at its inner wall to maintain a free space between the wall of said container and the wall of said test cavity once the volume therebetween is lowered.

59. The apparatus of claim 58, further comprising at least one pair of impedance measuring electrodes within said cavity, connected to an impedance measuring unit, the output thereof switchingly enabling and disabling further evacuation of said test cavity by means of said evacuation pump.

60. The apparatus of claim 48, wherein said test cavity is large enough to receive a multi-container batch of said containers.

61. The apparatus of claim 48, wherein said test cavity is significantly larger than said container and thus is apt to flexibly receive differently shaped and different volume containers.

62. The apparatus of claim 48, wherein said cavity comprises a removable cover and at least a pair of seals around the opening opened by said cover, the space between said two seals being pumped.

63. The apparatus of claim 48 for in-line testing a multitude of containers, further comprising a set of said test cavities to which a respective number of containers is fed for testing, and further comprising control means to prevent a test cavity being filled with at least one container to be tested once the container previously tested in said one test cavity has been detected as leaking.

64. The apparatus of claim 48, further comprising at least one cleaning gas line abutting into said cavity and being connected to a cleaning gas tank.

65. The apparatus according to claim 48 comprising a multitude of test cavities, arranged on a carrousel for in-line leak testing containers.

* * * * *